United States Patent
Wada et al.

(10) Patent No.: US 6,876,367 B2
(45) Date of Patent: Apr. 5, 2005

(54) DYNAMIC IMAGE PROCESSING METHOD, DYNAMIC IMAGE PROCESSOR AND DYNAMIC IMAGE DISPLAY DEVICE

(75) Inventors: Yoshifusa Wada, Tokyo (JP); Kenichi Kamijo, Tokyo (JP)

(73) Assignee: NEC Corporation, Tokyo (JP)

( * ) Notice: Subject to any disclaimer, the term of this patent is extended or adjusted under 35 U.S.C. 154(b) by 532 days.

(21) Appl. No.: 09/998,351

(22) Filed: Nov. 30, 2001

(65) Prior Publication Data

US 2002/0063702 A1 May 30, 2002

(30) Foreign Application Priority Data

Nov. 30, 2000 (JP) ........................................ 2000-364949

(51) Int. Cl.[7] .................................................. G09G 5/10
(52) U.S. Cl. ........................ 345/690; 345/611; 345/474; 348/607; 382/260
(58) Field of Search ................................ 345/611, 473, 345/374, 475, 690, 691; 382/260, 261, 262, 263, 264, 266, 268; 348/618, 620, 614, 607; 375/240.16

(56) References Cited

U.S. PATENT DOCUMENTS

| | | | | |
|---|---|---|---|---|
| 4,860,104 A | * | 8/1989 | Katsuyama | ................. 348/620 |
| 5,404,178 A | * | 4/1995 | Kondo et al. | ................. 348/618 |
| 5,473,384 A | * | 12/1995 | Jayant et al. | ................. 348/470 |
| 5,796,445 A | * | 8/1998 | Nomura et al. | ............. 348/607 |
| 5,886,744 A | * | 3/1999 | Hannah | .................. 375/240.16 |
| 5,949,916 A | * | 9/1999 | Chun | .......................... 382/261 |
| 6,185,254 B1 | * | 2/2001 | Ogata | ..................... 375/240.19 |

FOREIGN PATENT DOCUMENTS

| | | |
|---|---|---|
| EP | 0 863 671 A1 | 9/1998 |
| JP | 7327211 | 12/1995 |
| JP | 9312844 | 12/1997 |
| JP | 2795214 | 6/1998 |

* cited by examiner

Primary Examiner—Xiao Wu
(74) Attorney, Agent, or Firm—Dickstein, Shapiro, Morin & Oshinsky, LLP

(57) ABSTRACT

A method or a processor for filtering process for attenuation to a frequency component in a designated frequency band of a frequency of variation of a dynamic image by detecting the moving object; and subjecting at least a part of the moving object to a modified filtering process with at least a reduced attenuation or without attenuation and also subjecting a remaining part of the moving object to a normal filtering process with a non-reduced attenuation which is larger in magnitude than the reduced attenuation.

33 Claims, 8 Drawing Sheets

DYNAMIC IMAGE PROCESSING METHOD, DYNAMIC IMAGE PROCESSOR AND DYNAMIC IMAGE DISPLAY DEVICE

BACKGROUND OF THE INVENTION

1. Field of the Invention

The present invention relates to a dynamic image processing method, a dynamic image processor, and a dynamic image display device.

2. Description of the Related Art

As recent development of computer games and progress of computer graphics technology have been on the increase, various images and TV are displayed on a computer display device. Such images may include dynamic images which exhibit a large and high speed variation in brightness over time, for example, glaring dynamic images with high speed motions and intensive flashes. Such dynamic images provide a stress to a viewer who looks the display screen. It has been confirmed that such images cause a video display terminal stress which may cause a light sensibility trouble of the viewer.

The brightness variation over time at a frequency band from about 7 Hz to 60 Hz including 10 Hz is particularly sensible to the human. Japanese laid-open patent publication No. 2795214 discloses that to countermeasure the above problem, a time-filter is used to the dynamic image signal with the above brightness variation. The influence by the variation in brightness over time is reduced as follows. The variation in brightness signals or RGB-signals over time are processed by the time filter to attenuate a frequency component in the above influential frequency band for reducing the excessive stress to the viewer. Each of the RGB-signals may optionally be converted from analog signals to digital signals, so that the brightness of the digital signals or respective signal values are then processed by the time-filter. The most sensible frequency to the human may be confirmed by displaying white-and-black flashes over a gray-background with variations in contrast between white and black and in frequency.

The variation in brightness over time of the entirety of the image is extracted, so that only if the extracted variation exceeds a predetermined value, then the time filter processing is executed. The image may be represented by the analog or digital signals. The magnitude of variation in brightness over time or the magnitude of variation in RGB-signal values is integrated over an entirety of the display screen, so that a magnitude of the attenuation is adjusted in accordance with the integrated magnitude value.

A difference in brightness between a moving object of the dynamic image and the background image is detected. Namely, all of the moving objects are uniformly subjected to the time-filter independent from a displacement of the object with reference to a visual field and a relative speed to the visual field.

The recognition of the object moving over the dynamic image may be made by either an inter-frame differential coding method, a moving vector detecting method and a gradient method. Those methods may be optionally selected in consideration of the word load level, the hardware conditions, the quality of image and costs.

The above-described conventional technique is to subject moving objects to the uniform time-filtering process, whereby edges of the object on the image are non-sharp, and the motion of the object makes the viewer to feel not natural thereto.

In the above circumstances, the development of a novel dynamic image processing method, a dynamic image processor and a dynamic image display device free from the above problems is desirable.

SUMMARY OF THE INVENTION

Accordingly, it is an object of the present invention to provide a novel dynamic image processing method free from the above problems.

It is a further object of the present invention to provide a novel dynamic image processing method which may subject the moving object to the time-filtering process for attenuation to the variation in brightness over time of the dynamic image without causing the viewer to feel unnatural to the motion of the moving object over the dynamic image.

It is a still further object of the present invention to provide a novel dynamic image processor free from the above problems.

It is yet a further object of the present invention to provide a novel dynamic image processor which may subject the moving object to the time-filtering process for attenuation to the variation in brightness over time of the dynamic image without causing the viewer to feel unnatural to the motion of the moving object over the dynamic image.

It is a still further object of the present invention to provide a novel dynamic image display device free from the above problems.

It is yet a further object of the present invention to provide a novel dynamic image display device which may subject the moving object to the time-filtering process for attenuation to the variation in brightness over time of the dynamic image without causing the viewer to feel unnatural to the motion of the moving object over the dynamic image.

The present invention provides a method or a processor for filtering process for attenuation to a frequency component in a designated frequency band of a frequency of variation of a dynamic image by detecting the moving object; and subjecting at least a part of the moving object to a modified filtering process with at least a reduced attenuation or without attenuation and also subjecting a remaining part of the moving object to a normal filtering process with a non-reduced attenuation which is larger in magnitude than the reduced attenuation.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PREFERRED EMBODIMENTS

Figure 1:
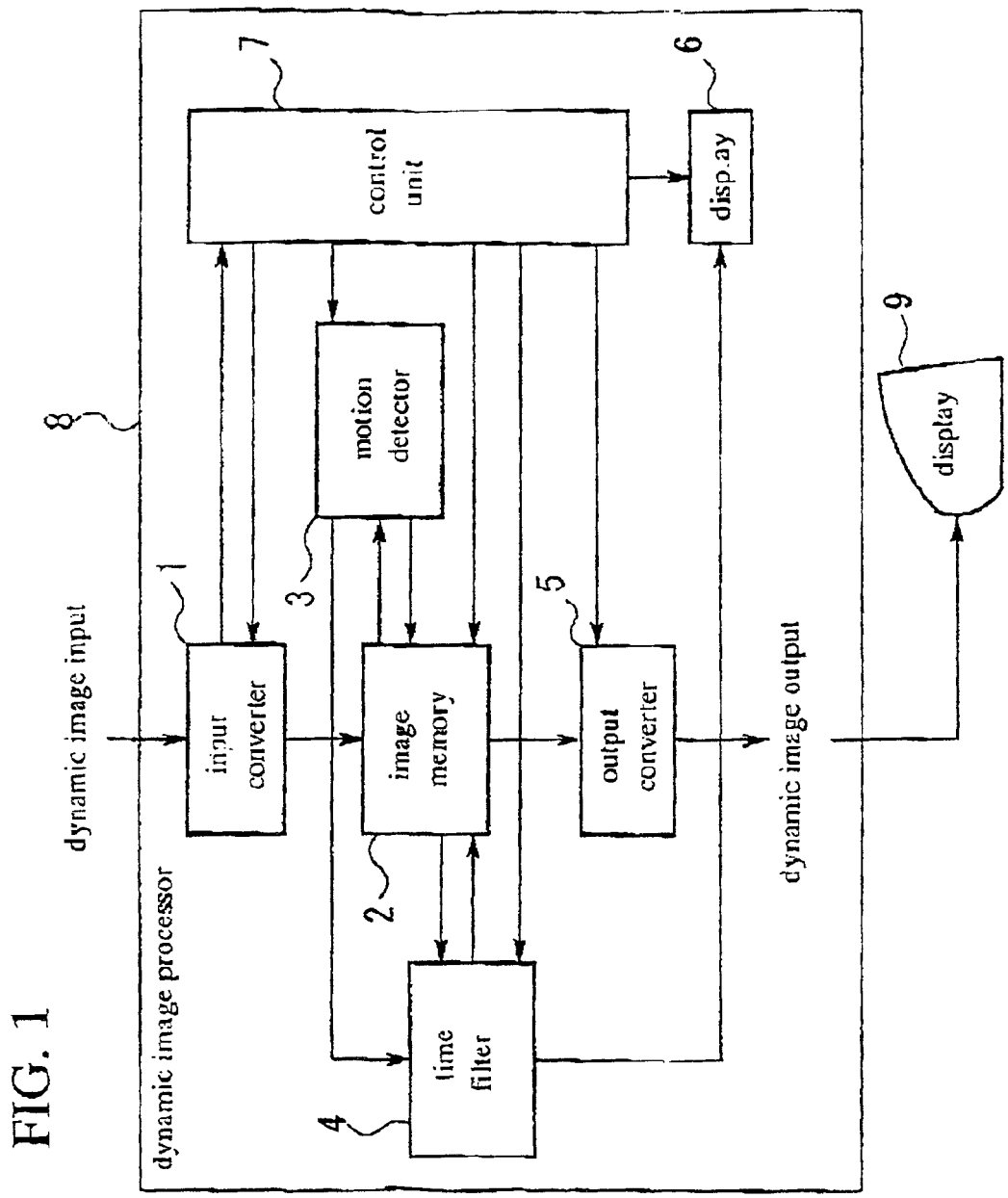
FIG. 1 is a block diagram illustrative of a dynamic image processor in a first embodiment in accordance with the present invention.

A first aspect of the present invention is a method of filtering process for attenuation to a frequency component in a designated frequency band of a frequency of variation of a dynamic image. The method comprises the step of: detecting the moving object; and subjecting at least a part of the moving object to a modified filtering process with at least a reduced attenuation and also a remaining part of the moving object to a normal filtering process with a non-reduced attenuation which is larger in magnitude than the reduced attenuation.

It is possible that an entirety of the moving object is uniformly subjected to the modified filtering process.

It is possible that the moving object is extracted depending on at least one factor of a size, a shape, a brightness, a color and a moving speed of the object.

It is possible that the reduced attenuation is fixed at a single magnitude of the attenuation.

It is possible that the reduced attenuation is selected from plural different magnitudes of the attenuation.

It is possible that the reduced attenuation is set at an optional value.

It is possible to further comprise the step of: decoding a compressed dynamic image data prior to detecting the moving object based on the decoded dynamic image data.

A second aspect of the present invention is a method of filtering process for attenuation to a frequency component in a designated frequency band of a frequency of variation of a dynamic image. The method comprises the step of: detecting the moving object; and subjecting at least a part of the moving object to a modified filtering process with no attenuation and also a remaining part of the moving object to a normal filtering process with a predetermined attenuation.

It is possible that an entirety of the moving object is uniformly subjected to the modified filtering process.

It is possible that the moving object is extracted depending on at least one factor of a size, a shape, a brightness, a color and a moving speed of the object.

It is possible to further comprise the step of: decoding a compressed dynamic image data prior to detecting the moving object based on the decoded dynamic image data.

A third aspect of the present invention is a processor for processing a dynamic image including: a motion detector for detecting a moving object which moves over the dynamic image; and a time-filter processing unit for attenuation to a frequency component in a designated frequency band of a frequency of variation of a dynamic image, wherein the time-filter processing unit further includes a filtering-process control unit which subjects at least a part of the moving object to a modified filtering process with at least a reduced attenuation and also subjects a remaining part of the moving object to a normal filtering process with a non-reduced attenuation which is larger in magnitude than the reduced attenuation.

It is possible that the filtering-process control unit uniformly subjects an entirety of the moving object to the modified filtering process.

It is possible that the motion detector detects the moving object depending on at least one factor of a size, a shape, a brightness, a color and a moving speed of the object.

It is possible that the filtering-process control unit sets the reduced attenuation at a single magnitude of the attenuation.

It is possible that the filtering-process control unit selects the reduced attenuation from plural different magnitudes of the attenuation.

It is possible that the filtering-process control unit sets the reduced attenuation at an optional value.

It is possible to further include a compression data decoder for decoding a compressed dynamic image data so that the motion detector detects the moving object based on the decoded dynamic image data.

A fourth aspect of the present invention is a processor for processing a dynamic image including: a motion detector for detecting a moving object which moves over the dynamic image; and a time-filter processing unit for attenuation to a frequency component in a designated frequency hand of a frequency of variation of a dynamic image, wherein the time-filter processing unit further includes a filtering-process control unit which subjects at least a part of the moving object to a modified filtering process without attenuation and also subjects a remaining part of the moving object to a normal filtering process with a predetermined attenuation.

It is possible that the filtering-process control unit uniformly subjects an entirety of the moving object to the modified filtering process.

It is possible that the motion detector detects the moving object depending on at least one factor of a size, a shape, a brightness, a color and a moving speed of the object.

It is possible to further include a compression data decoder for decoding a compressed dynamic image data so that the motion detector detects the moving object based on the decoded dynamic image data.

A fifth aspect of the present invention is a display device for processing a dynamic image including: a motion detector for detecting a moving object which moves over the dynamic image; a time-filter processing unit for attenuation to a frequency component in a designated frequency band of a frequency of variation of a dynamic image; and a display unit for displaying a dynamic image based on a dynamic image signal which has been processed by the time-filter processing unit, wherein the time-filter processing unit further includes a filtering-process control unit which subjects at least a part of the moving object to a modified filtering process with at least a reduced attenuation and also subjects a remaining part of the moving object to a normal filtering process with a non-reduced attenuation which is larger in magnitude than the reduced attenuation.

It is possible that the filtering-process control unit uniformly subjects an entirety of the moving object to the modified filtering process.

It is possible that the motion detector detects the moving object depending on at least one factor of a size, a shape, a brightness, a color and a moving speed of the object.

It is possible that the filtering-process control unit sets the reduced attenuation at a single magnitude of the attenuation.

It is possible that the filtering-process control unit selects the reduced attenuation from plural different magnitudes of the attenuation.

It is possible that the filtering-process control unit sets the reduced attenuation at an optional value.

It is possible to further include a compression data decoder for decoding a compressed dynamic image data so that the motion detector detects the moving object based on the decoded dynamic image data.

A sixth aspect of the present invention is a display device for processing a dynamic image including: a motion detector for detecting a moving object which moves over the dynamic image; a time-filter processing unit for attenuation to a frequency component in a designated frequency band of a frequency of variation of a dynamic image; and a display unit for displaying a dynamic image based on a dynamic image signal which has been processed by the time-filter processing unit, wherein the time-filter processing unit further includes a filtering-process control unit which subjects at least a part of the moving object to a modified filtering process without attenuation and also subjects a remaining part of the moving object to a normal filtering process with a predetermined attenuation.

It is possible that the filtering-process control unit uniformly subjects an entirety of the moving object to the modified filtering process.

It is possible that the motion detector detects the moving object depending on at least one factor of a size, a shape, a brightness, a color and a moving speed of the object.

It is possible to further include a compression data decoder for decoding a compressed dynamic image data so that the motion detector detecting the moving object based on the decoded dynamic image data.

First Embodiment

A first embodiment according to the present invention will be described in detail with reference to the drawings. FIG. 1 is a block diagram illustrative of a dynamic image processor in a first embodiment in accordance with the present invention. A dynamic image processor 8 includes an input data converting unit 1, an image memory unit 2, a motion detecting unit 3, a time-filtering processing unit 4, an output data converting unit 5, a display unit 6, and a control unit 7.

The input data converting unit 1 receives an input of a dynamic image signal and converts the a dynamic image signal into a data format for the image processing. The input data converting unit 1, for example, performs an analog-to-digital conversion for converting an analog dynamic image signal into a digital dynamic image signal. The image memory unit 2 is electrically coupled to the input data converting unit 1 for receiving the digital dynamic image signal from the input data converting unit 1. The image memory unit 2 is also electrically coupled to the time-filtering processing unit 4 for receiving a digital dynamic image signal on the time-filtering process from the time filtering processing unit 4. The image memory unit 2 stores plural frames of the digital dynamic image signals in frame units.

The motion detecting unit 3 is electrically coupled to the image memory unit 2 for reading the image in the frame unit out from the image memory unit 2 and detecting a moving object over frames. The time-filtering processing unit 4 is electrically coupled to the image memory unit 2 and also to the motion detecting unit 3 for attenuating a frequency component in a predetermined frequency band of a frequency, at which an dynamic image varies over time. The output data converting unit 5 converts the filter-processed digital dynamic image data into a dynamic image signal.

The display unit 6 is electrically coupled to the time-filtering processing unit 4 for receiving an information of the attenuation to the signals by the time-filtering processing unit 4 and converts an intensity of stress to a human by the dynamic image into values through a predetermined operation expression based on the attenuation for displaying the same. The control unit 7 is electrically coupled to the input data converting unit 1, the image memory unit 2, the motion detecting unit 3, the time-filtering processing unit 4, the output data converting unit 5, and the display unit 6 for controlling operations in timings thereof. The control unit 7 also includes a filtering control unit for controlling the filtering process of the time-filtering processing unit 4.

If the inputted dynamic image signal is an interlaced dynamic signal such as a TV broadcasting data, then under the control by the control unit 7 odd number frames and even number frames are separately stored into the image memory unit 2, so that the odd number frames and the even number frames are then processed separately. The time-filtering processed odd and even number frames are synthesized under the control by the control unit 7 for subsequent transmission of the synthesized dynamic image data to the output data converting unit 5.

The dynamic image processor 8 is electrically coupled to a dynamic image display unit 9 which displays the dynamic image based in the dynamic image signal supplied from the dynamic image processor 8. The dynamic image display device comprises the dynamic image processor 8 and the dynamic image display unit 9. The dynamic image display unit 9 may be realized by any available display device such as a cathode ray tube (CRT), a liquid crystal display device and a projector.

Figure 2:
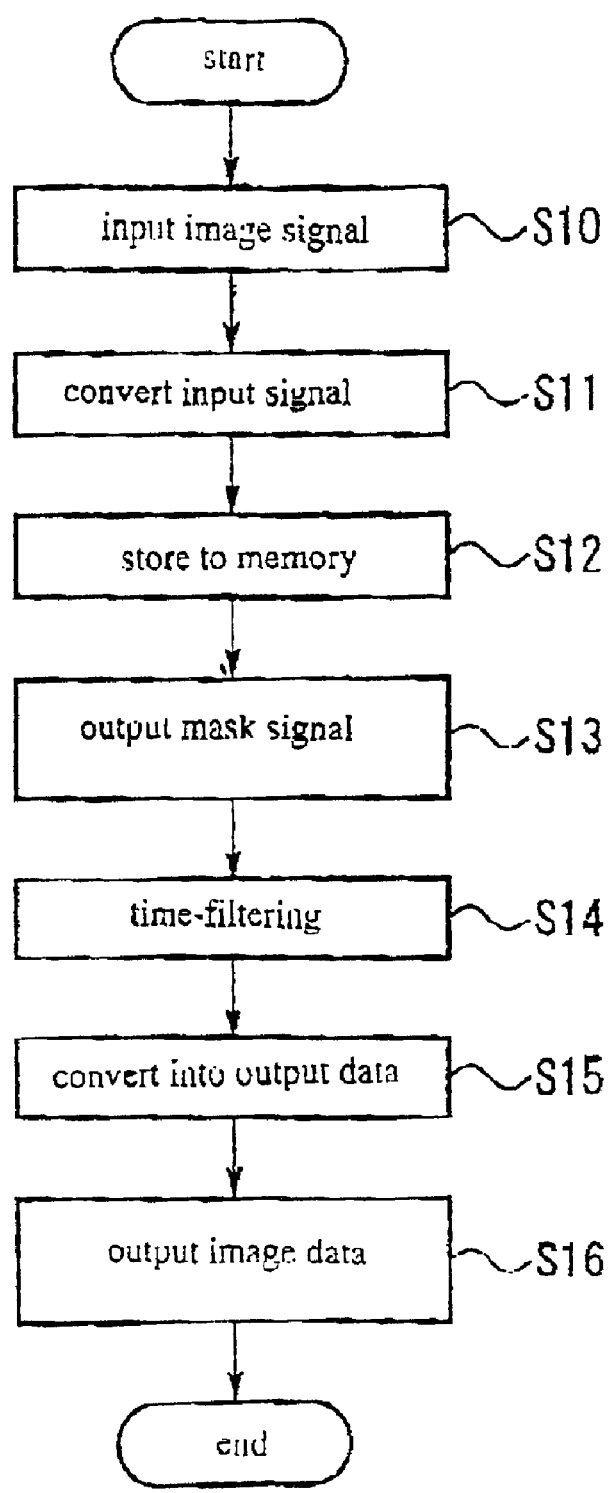
FIG. 2 is a flow chart illustrative of operations of the dynamic image processor of FIG. 1.

Operations of the dynamic image processor 8 will be described. FIG. 2 is a flow chart illustrative of operations of the dynamic image processor of FIG. 1. In a step S10, the dynamic image signal is inputted into the input data converting unit 1, wherein the dynamic image signal may, for example, be National Television System Committee System TV signal. In a step S11, the input data converting unit 1 converts the inputted dynamic image signal into digital dynamic image data, for example, 8-bits RGB data. In a step S12, the image memory unit 2 sequentially stores the digital dynamic image data in frame unit which have been sequentially outputted from the input data converting unit 1. In a step S13, the motion detecting unit 3 reads the digital dynamic image data out from the image memory unit 2 and detect an inter-frame difference signal for detecting the moving object, so that the motion detecting unit 3 supplies the time-filtering processing unit 4 with a dynamic image mask signal which makes an image region, through which the object has moved, into a mask region which is not subjected to the time-filtering process.

In a step S14, the time-filtering processing unit 4 reads the digital dynamic image data from the image memory unit 2 and performs the time-filtering process to the image region which is not masked by the dynamic image mask for attenuation of the frequency component in the predetermined frequency band of the frequency of the brightness variation of the dynamic image. The region masked by the dynamic image mask is not subjected to the time-filtering process. The above described operations are performed under the control of the filtering control unit included in the control unit 7. The timing control for masking the time-filtering process by the dynamic image mask signal is conducted by the control unit 7.

Detailed structures find operations of the motion detecting unit 3 and the time-filtering processing unit 4 will be described later.

In a step S15, the output data converting unit 5 converts the time-filtered digital dynamic image data into the dynamic image signal in the predetermined format. In a step S16, the output data converting unit 5 outputs the dynamic image signal. The dynamic image display unit 9 receives the dynamic image signal and displays the time filtered dynamic image. The time-filtering process is made in consideration of the moving object with preventing the viewer from feeling unnatural to the moving object over the dynamic image.

The intensity of the stress to the human body by the dynamic image, which is on the time-filtering process, is displayed on the display unit 6 with numerical expression which is obtained from the operation of the time-filtering processing unit 4. This quantization operation or the numerical expression will be described later in detail. It is possible as a modification that the dynamic image processor 8 is free of the display unit 6, and the above numerical value is processed by On-Screen-Display Process and added to the dynamic image signal for displaying the same with character informations on a selected area of the screen of the dynamic image display unit 9.

Figure 3:
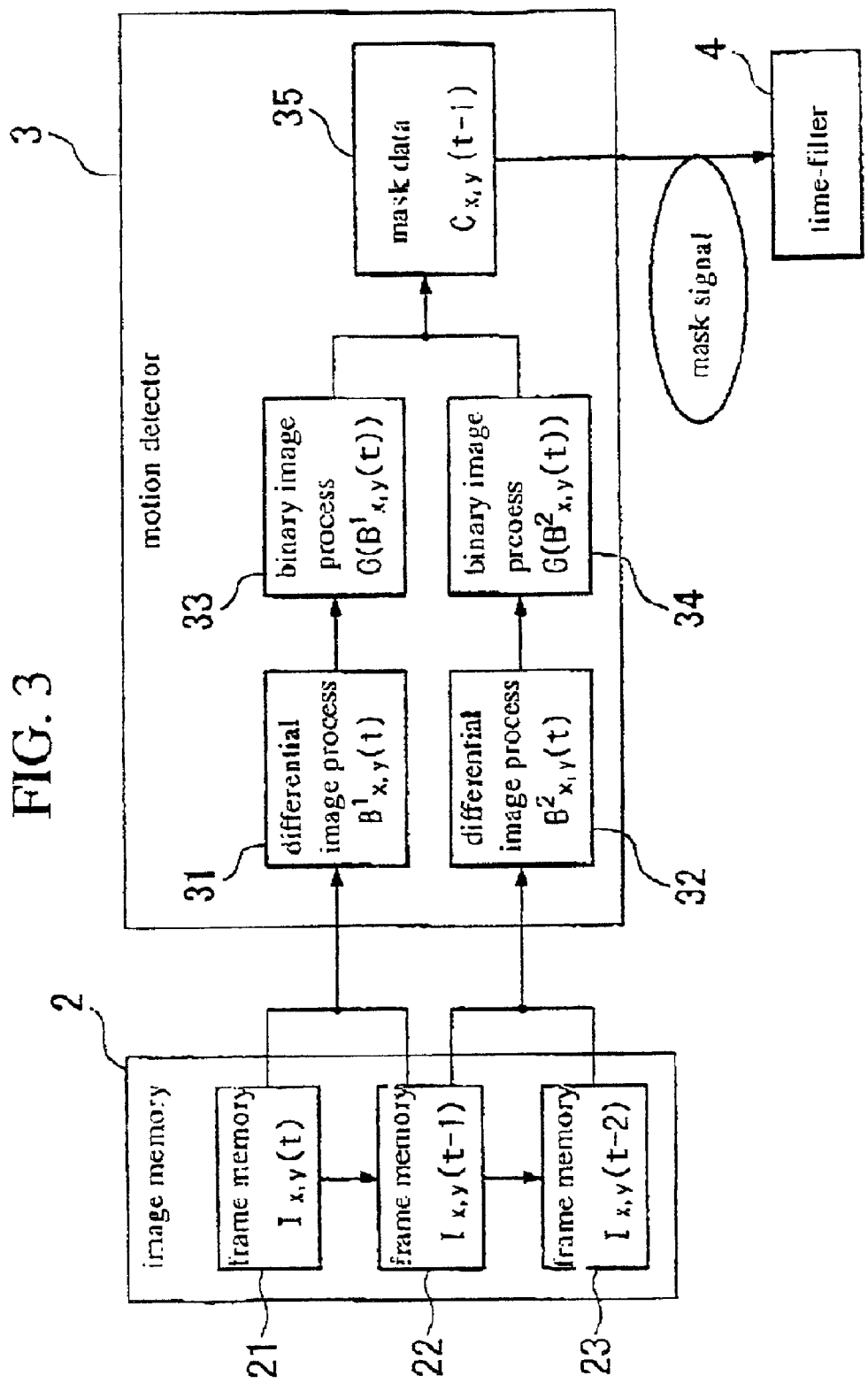
FIG. 3 is a block diagram illustrative of internal structures of the image memory unit and the motion detecting unit included in the dynamic image processor shown in FIG. 1.

Structure and operations of the motion detecting unit 3 in cooperation with the image memory unit 2 will be described. FIG. 3 is a block diagram illustrative of internal structures of the image memory unit and the motion detecting unit included in the dynamic image processor shown in FIG. 1.

The image memory unit 2 includes a first frame memory 21, a second frame memory 22, and a third frame memory 23. The first frame memory 21 stores the inputted digital dynamic image signal. The second frame memory 22 stores the digital dynamic image signal supplied from the first frame memory 21. The third frame memory 23 stores the digital dynamic image signal supplied from the second frame memory 22.

The motion detecting unit 3 includes a first differential image processing unit 31, a second differential image processing unit 32, a first binary image processing unit 33, a second binary image processing unit 34, and a dynamic image mask data creating unit 35. The first differential image processing unit 31 operates a first differential image $B^1_{x,y}(t)$ from the digital dynamic image signals from the first and second frame memories 21 and 22. The second differential image processing unit 32 operate, a second differential image $B^2_{x,y}(t)$ from the digital dynamic image signals from the second and third frame memories 22 and 23.

The first binary image processing unit 33 compares the first differential image $B^1_{x,y}(t)$ supplied from the first differential image processing unit 31 to a designated threshold value for converting the first differential image $B^1_{x,y}(t)$ into a first binary image $G(B^1_{x,y}(t))$. The second binary image processing unit 34 compares the second differential image $B^2_{x,y}(t)$ supplied from the second differential image processing unit 32 to a designated threshold value for converting the second differential image $B^2_{x,y}(t)$ into a second binary image $G(B^2_{x,y}(t))$. The dynamic image mask data creating unit 35 operates a logic-AND of the first binary image $G(B^1_{x,y}(t))$ supplied from the first binary image processing unit 33 and the second binary image $G(B^2_{x,y}(t))$ supplied from the second binary image processing unit 34 for creating a dynamic image mask data $C_{x,y}(t-1)$ and outputting the dynamic image mask signal. The dynamic image mask data creating unit 35 uses the following equation for the AND operation.

$$C_{x,y}(t-1)=G(B^1_{x,y}(t))\cap G(B^2_{x,y}(t))$$

Figure 4:
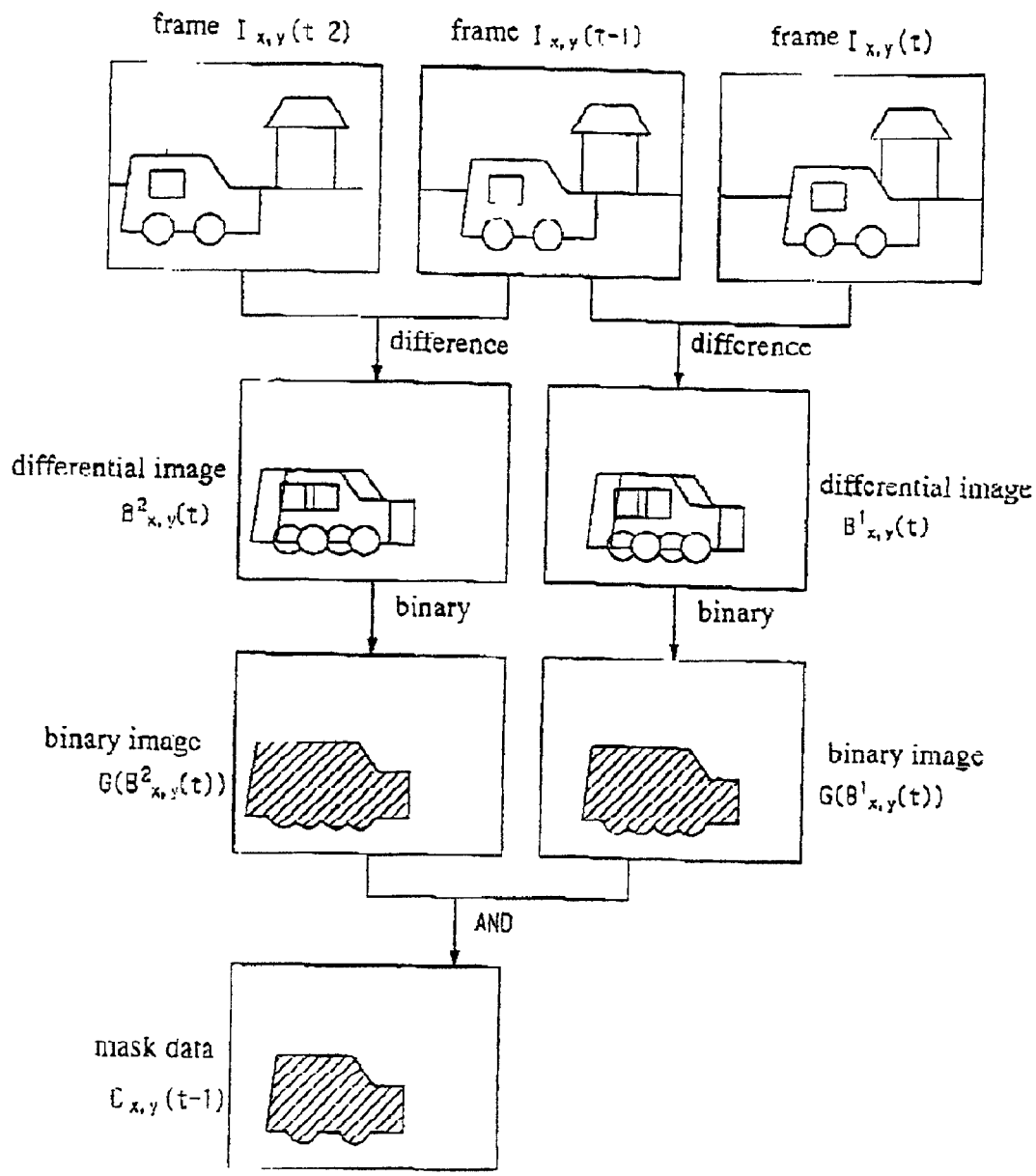
FIG. 4 is a view illustrative of Operations of the motion detecting unit in co-operation with the image memory unit.

Operations to the motion detecting unit 3 in co-operation with the image memory unit 2 will subsequently be described. FIG. 4 is a view illustrative of Operations of the motion detecting unit in co-operation with the image memory unit. A moving object is a car. It is assumed that the first frame memory 21 has stored a first frame $I_{x,y}(t-2)$, the second frame memory 22 has stored a second frame $I_{x,y}(t-1)$, and the third frame memory 23 has stored a third frame $I_{x,y}(t)$.

The motion detecting unit 3 shows the following operations to calculate the dynamic image mask data. The first differential image processing unit 31 operates a first differential image $B^1_{x,y}(t)$ from the digital dynamic image signals from the first and second frame memories 21 and 22. The second differential image processing unit 32 operates a second differential image $B^2_{x,y}(t)$ from the digital dynamic image signals from the second and third frame memories 22 and 23. The first binary image processing unit 33 compares the first differential image $B^1_{x,y}(t)$ supplied from the first differential image processing unit 31 to a designated threshold value for converting the first differential image $B^1_{x,y}(t)$ into a first binary image $G(B^1_{x,y}(t))$. The second binary image processing unit 34 compares the second differential image $B^2_{x,y}(t)$ supplied from the second differential image processing unit 32 to a designated threshold value for converting the second differential image $B^2_{x,y}(t)$ into a second binary image $G(B^2_{x,y}(t))$. The dynamic image mask data creating unit 35 operates a logic-AND of the first binary image $G(B^1_{x,y}(t))$ supplied from the first binary image processing unit 33 and the second binary image $G(B^2_{x,y}(t))$ supplied from the second binary image processing unit 34 for creating a dynamic image mask data $C_{x,y}(t-1)$ and outputting the dynamic image mask signal. The cross hatched region represents the mask region which is inhibited for the time-filtering process.

In accordance with the present embodiment, the motion is detected based on a difference in brightness. It is also possible as a modification that the motion is detected based on a difference in color. It is also possible as a modification that the motion is detected based on a difference in moving speed which has been calculated from a moved distance of the moving object. In accordance with the present embodiment, the moving object is detected based on the inter-frame differential coding method. It is also possible as a modification that the moving object is detected based on a motion vector which has been extracted from a determined correspondent pixel between the flames. There is also available a gradient method for extracting a time variation in a partial gradient of the spatial device of the frame and calculating the motion vector based on the time variation in the spatial gradient. Other available methods for detecting the moving object may be optional. It is further possible as a modification that each of the first and second binary image processing units 33 and 34 has an additional function to eliminate a noise by a scaling process.

One example of the method of creating the dynamic image mask signal from the dynamic image mask data will be described. The time-filtering processing unit 4 reads the image from the image memory unit 2. The time-filtering process is started from the left top pixel on the screen. In synchronizing with the timing of processing the image data at the pixel, the dynamic image mask data are red out to create the dynamic image mask signal. The non-crosshatched region which is to be time-filtered is read as the "H" level, and the crosshatched region which is to be not time-filtered is read as the "L" level. The "L" level signal representing the non-time-filtering region is inputted into the time filtering processing unit 4, then the time-filtering processing unit 4 does not perform the time-filtering process or does adjust the attenuation to the frequency component based on the "L" level signal.

Figure 5:
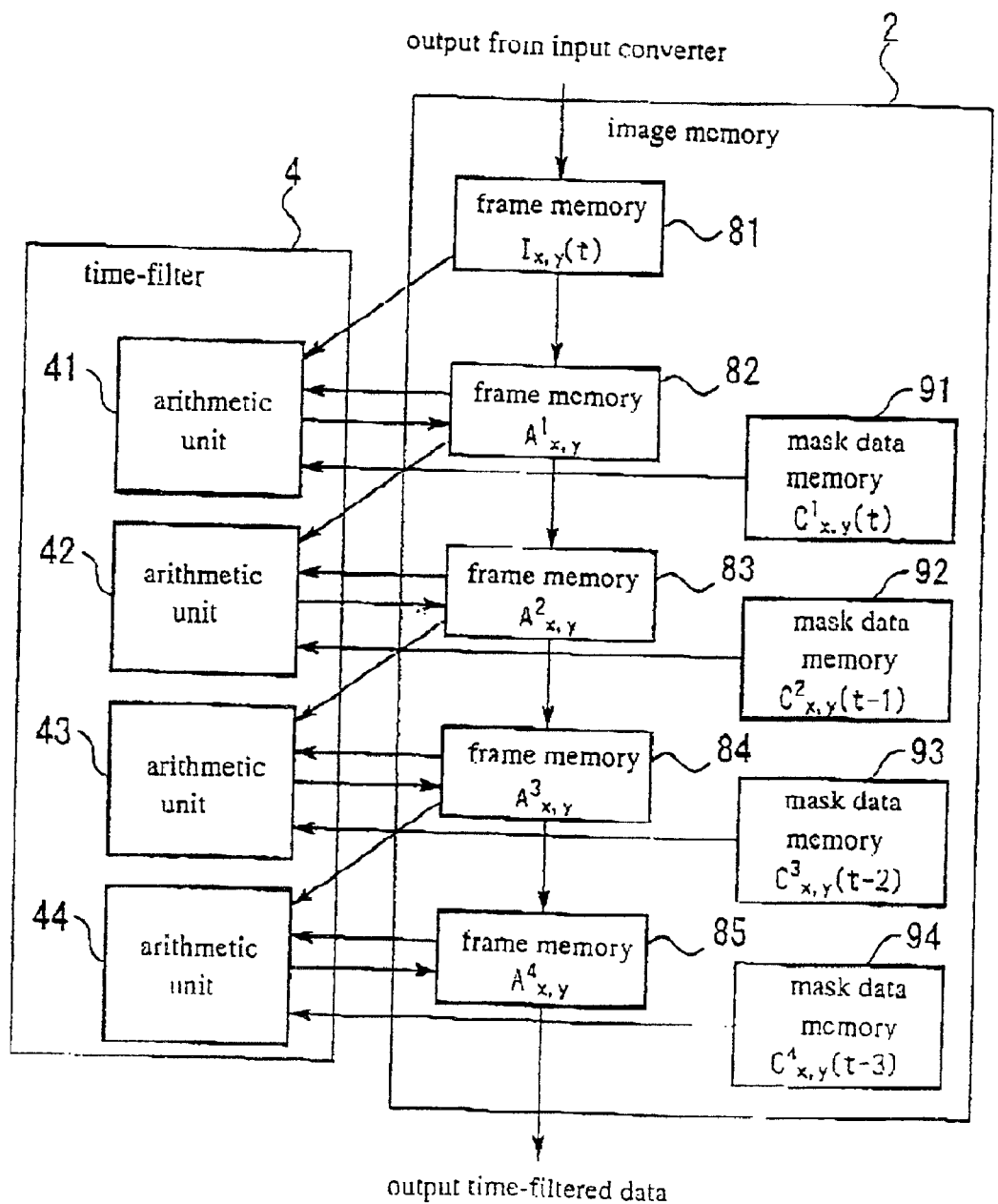
FIG. 5 is a block diagram illustrative of internal structures of the image memory unit and the time-filtering processing unit included in the dynamic image processor shown in FIG. 1.

The time-filtering process will be described. FIG. 5 is a block diagram illustrative of internal structures of the image memory unit and the time-filtering processing unit included in the dynamic image processor shown in FIG. 1. The time-filtering processing unit 4 includes a first arithmetic processing unit 41 on a first stage, a second arithmetic processing unit 42 on a second stage, a third arithmetic processing unit 43 on a third stage, and a fourth arithmetic processing unit 44 on a fourth stage.

The image memory unit 2 includes a first frame memory 81 for storing a first frame $I_{x,y}(t)$, a second frame memory 82 for storing a second frame $A^1_{x,y}$, a third frame memory 83 for storing a third frame $A^2_{x,y}$, a fourth frame memory 84 for storing a fourth frame $A^3_{x,y}$, and a fifth frame memory 85 for storing a fourth frame $A^4_{x,y}$, as well as a first dynamic image mask data memory 91 for storing a first dynamic image mask data $C^1_{x,y}(t)$ a second dynamic image mask data memory 92 for storing a second dynamic image mask data $C^2_{x,y}(t-1)$, a third dynamic image mask data memory 93 for storing a third dynamic image mask data $C^3_{x,y}(t-2)$, and a fourth dynamic image mask data memory 94 for storing a fourth dynamic image mask data $C^4_{x,y}(t\ 3)$. The first to fourth dynamic image mask data memories 91, 92, 93 and 94 sequentially store the dynamic image mask data created by the motion detecting unit 3. The string of the data is the dynamic image mask signal which controls the time filtering processing unit 4.

In order to perform the time-filtering process in brightness between the frames of the pixels, the plural frame memories 81–85 are connected in series to each other to form a multi-stage. The number of the multistage corresponds to the number of the stage of the time-filter. The number of the stage of the time-filter is a parameter for adjusting the filtering effect and the smoothness of the processed images over time. In consideration of the effect of the filter and the cost, the number of the stage may be preferable at 10 or less. The time-filtering process may, for example, use the four-stages. The first to fourth arithmetic processing units 41, 42, 43 and 44 connected to the corresponding frame memories 81–85 form the four stage filter functions. The dynamic images are inputted in the frame unit are processed by the multi-stage filtering functions for obtaining a smooth filtering process. The dynamic image mask signal controls the time-filtering process to the moving object.

On the first stage filter, the first arithmetic processing unit 41 receives the image data $l_{x,y}(t)$ in the first frame memory 81, the frame data $A^1_{x,y}(t-1)$ stored in the second frame memory 82 and previously operated by the first arithmetic processing unit 41, the mask data $C^1_{x,y}(t)$ stored in the first mask data memory 91, and a current time-constant τ(t), so that the first arithmetic processing unit 41 operates the following equation to obtain the frame data $A^1_{x,y}(t)$ $A^1_{x,y}(t)=\tau(t)A^1_{x,y}(t-1)+(1-\tau(t)$, provided that $C^1_{x,y}(t)=1$ $A^1_{x,y}(t)=I_{x,y}(t)$, provided that $C^1_{x,y}(t)=0$ The first arithmetic processing unit 41 writes the image data $A^1_{x,y}(t)$ into the second frame memory 82.

$C^1_{x,y}(t)=1$ corresponds to the cross-hatched region of the moving object, where the cross-hatched region corresponds to the "L" level. $C^1_{x,y}(t)=0$ corresponds to the non-cross-hatched region of the moving object, where the non-cross-hatched region corresponds to the "II" level. The control unit 7 has a filtering-process control unit for controlling the arithmetic operations by the first to fourth arithmetic processing units 41–44 based on the mask data $C^1_{x,y}(t)$, $C^2_{x,y}(t-1)$, $C^3_{x,y}(t-2)$, and $C^4_{x,y}(t-3)$.

The time constant τ(t) is a time constant of the time-filtering process which is set depending on the brightness variation of the entirety of the image in the single frame, which may corresponds to the magnitude of the visual stimulus to the human. This time constant may be set to each stage of the filter. The calculation of the time constant is made by the time filtering processing unit 4, wherein the time-filtering processing unit 4 further includes a brightness variation extracting unit for obtaining a variation in brightness of the image. The brightness variation extracting unit fetches the last frame data and the image data for calculating the threshold value from the image memory unit 2, and finding a difference in brightness value between both images at the same pixel, and summing the differences over all the pixels. The sum value normalized in maximum brightness of the image to find an effective attenuation E(t). The function of the time constant for the time-filtering is set based on the magnitude of the effective attenuation E(t). Constant included in the junction of the time constant may be selected clinically. Plural constants may optionally be set for the purpose of clinical text to the light-sensible trouble. This constant may alternatively be set at an optional value. The time constant τ(t) and the effective attenuation E(t) are disclosed in Japanese patent No. 2795214.

For allowing the display unit 6 to numerically display the intensity of the stress to the human by the dynamic image, it is possible to use the time constant τ(t) and the effective attenuation E(t). A difference in the effective attenuation E(t) between after and before the time-filtering processes is found to numerically represent an effect of the time-filtering process and display the effect on the display unit 6.

On the second stage filter, the second arithmetic processing unit 42 receives the frame data $A^1_{x,y}(t-1)$ stored in the second frame memory 82 and the frame data $A^2_{x,y}(t-1)$ stored in the third frame memory 83, the mask data $C^2_{x,y}(t\ 1)$ stored in the second mask data memory 92, and the current time-constant τ(t), so that the second arithmetic processing unit 42 operates the following equation to obtain the frame data $A^2_{x,y}(t)$ $A^2_{x,y}(t)=\tau(t)A^2_{x,y}(t-1)+(1-\tau(t))A^1_{x,y}(t)$, provided that $C^2_{x,y}(t)=1$ $A^2_{x,y}(t)=A^1_{x,y}(t)$, provided that $C^2_{x,y}(t)=0$ The second arithmetic processing unit 42 writes the image data $A^2_{x,y}(t)$ into the third frame memory 83.

On the third stage filter, the third arithmetic processing unit 43 receives the frame data $A^2_{x,y}(t-1)$ stored in the third frame memory 83 and the frame data $A^3_{x,y}(t-1)$ stored in the fourth frame memory 84, the mask data $C^3_{x,y}(t-2)$ stored in the third mask data memory 93, and the current time constant τ(t), so that the third arithmetic processing unit 43 operates the following equation to obtain the frame data $A^3_{x,y}(t)$ $A^3_{x,y}(t)=\tau(t)A^3_{x,y}(t-1)+(1-\tau(t))A^2_{x,y}(t)$, provided that $C^3_{x,y}(t)=1$ $A^3_{x,y}(t)=A^2_{x,y}(t)$, provided that $C^3_{x,y}(t)=0$ The third arithmetic processing unit 43 writes the image data $A^3_{x,y}(t)$ into the fourth frame memory 84.

On the fourth stage filter, the fourth arithmetic processing unit 44 receives the frame data $A^3_{x,y}(t-1)$ stored in the fourth frame memory 84 and the frame data $A^4_{x,y}(t-1)$ stored in the fifth frame memory 85, the mask data $C^4_{x,y}(t-3)$ stored in the fourth mask data memory 94, and the current time-constant τ(t), so that the fourth arithmetic processing unit 44 operates the following equation to obtain the frame data $A^4_{x,y}(t)$ $A^4_{x,y}(t)=\tau(t)A^4_{x,y}(t\text{-}1)+(1-\tau(t))A^3_{x,y}(t)$, provided that $C^4_{x,y}(t)=1$ $A^4_{x,y}(t)=A^3_{x,y}(t)$, provided that $C^4_{x,y}(t)=0$ The fourth arithmetic processing unit 44 writes the image data $A^4_{x,y}(t)$ into the fifth frame memory 85.

It is optionally possible that the first to fourth arithmetic processing units 41–44 operate pseudo-parallel processings.

As described above, the time-filtering processing unit 4 operates the time-filtering process under the control of the dynamic image mask signal. In accordance with the above embodiment, the time-filtering process is made to the brightness. The time-filtering process may be made to Red, Green and Blue separately or to selected one or two of Red, Green and Blue. The time-filtering process may also be made with different respective attenuations to Red, Green and Blue. The time-filtering process may also be made to other color than Red, Green and Blue.

Second Embodiment

A second embodiment according to the present invention will be described in detail with reference to the drawings. In the first embodiment, the filtering effect is not applied to the moving object. In the second embodiment, however, an attenuated filtering effect is applied to the moving object. The arithmetic processing unit on the "j-th" stage operates in the following equations.

$$A^j_{x,y}(t)=\tau(t)A^j_{x,y}(t\text{-}1)+(1-\tau(t))A^{j-1}_{x,y}(t), \text{ provided that } C^j_{x,y}(t)=1 \quad (1)$$

$$A^j_{x,y}(t)=qA^{j-1}_{x,y}(t)+(1-q)\{\tau(t)A^j_{x,y}(t\text{-}1)+(1-\tau(t))A^{j-1}_{x,y}(t)\}, \text{ provided that } Cj^4_{x,y}(t)=0 \quad (2)$$

Figure 6:
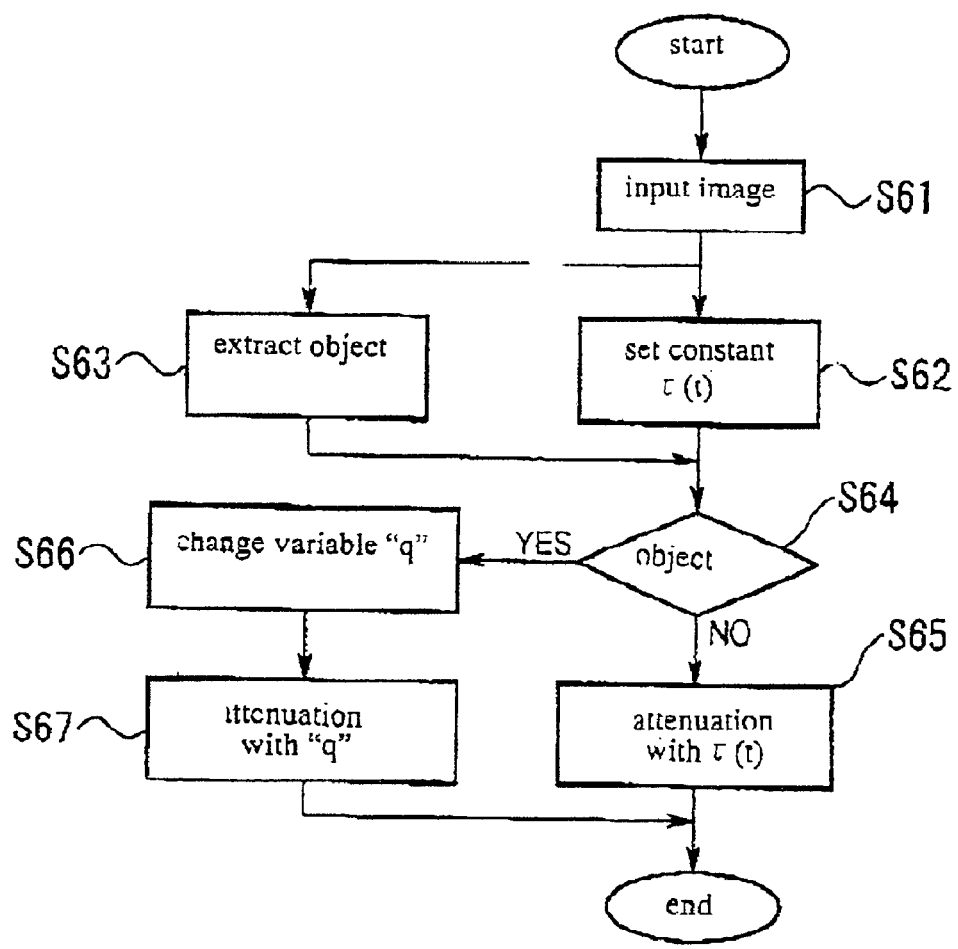
FIG. 6 is a flow chart of operations of the time-filtering processing unit included in the dynamic image processor in a second embodiment in accordance with the present invention.

FIG. 6 is a flow chart of operations of the time-filtering processing unit included in the dynamic image processor in a second embodiment in accordance with the present invention.

In a step S61, image data are inputted by the input data converting unit 1 into the time-filtering processing unit 4. In a step S62, the time-filtering processing unit 4 sets the time constant $\tau(t)$. In a step S63, the motion detecting unit 3 extracts the moving object to create the dynamic image mask data. In a step S64, a dynamic image mask signal is created from the dynamic image mask data, for judging the moving object which is masked from the time-filtering process. In a step S65, if it is not the moving object, the time-filtering processing unit 4 calculates the image as attenuated using the time constant $\tau(t)$ of the time-filter in accordance with the above equation (1). In a step S66, if it is the moving object, the time-filtering processing unit 4 sets a filter-control variable "q". In a step S67, the time-filtering processing unit 4 calculates the image as attenuated using the above equation (2). The calculated images are synthesized to complete the time-filtering process.

The modified time-filtering process to the moving object is made with subjecting the moving object to the control by the filtering-control variable "q", and the normal time-filtering process is made to the other image such as background image than the moving object. If the time-filter is the multi-stage time filter, then the time constant $\tau(t)$ may optionally be made to each of the plural stages separately. It is also possible that the above steps 62 and 63 are concurrently made.

Third Embodiment:

A third embodiment according to the present invention will be described in detail with reference to the drawings. In the third embodiment, either one of the specifically calculated time constant $\tau_1(t)$ and the above normal time constant $\tau(t)$ is selected for conducting the time-filtering process, wherein the specifically calculated time constant $\tau_1(t)$ is for a specific part of the masked region by the dynamic image mask signal. The time constant $\tau_1(t)$ may be calculated in accordance with the same equations as used for the time constant $\tau(t)$, provided that the constant in the equation is changed to an optional constant value, so that the time constant $\tau_1(t)$ is different from the time constant $\tau(t)$. The equation (1) is always used independent from whether $C^j_{x,y}(t)=0$ or 1, provided that if $C^j_{x,y}(t)=0$ then the time constant $\tau(t)$ is replaced by the time constant $\tau_1(t)$.

Figure 7:
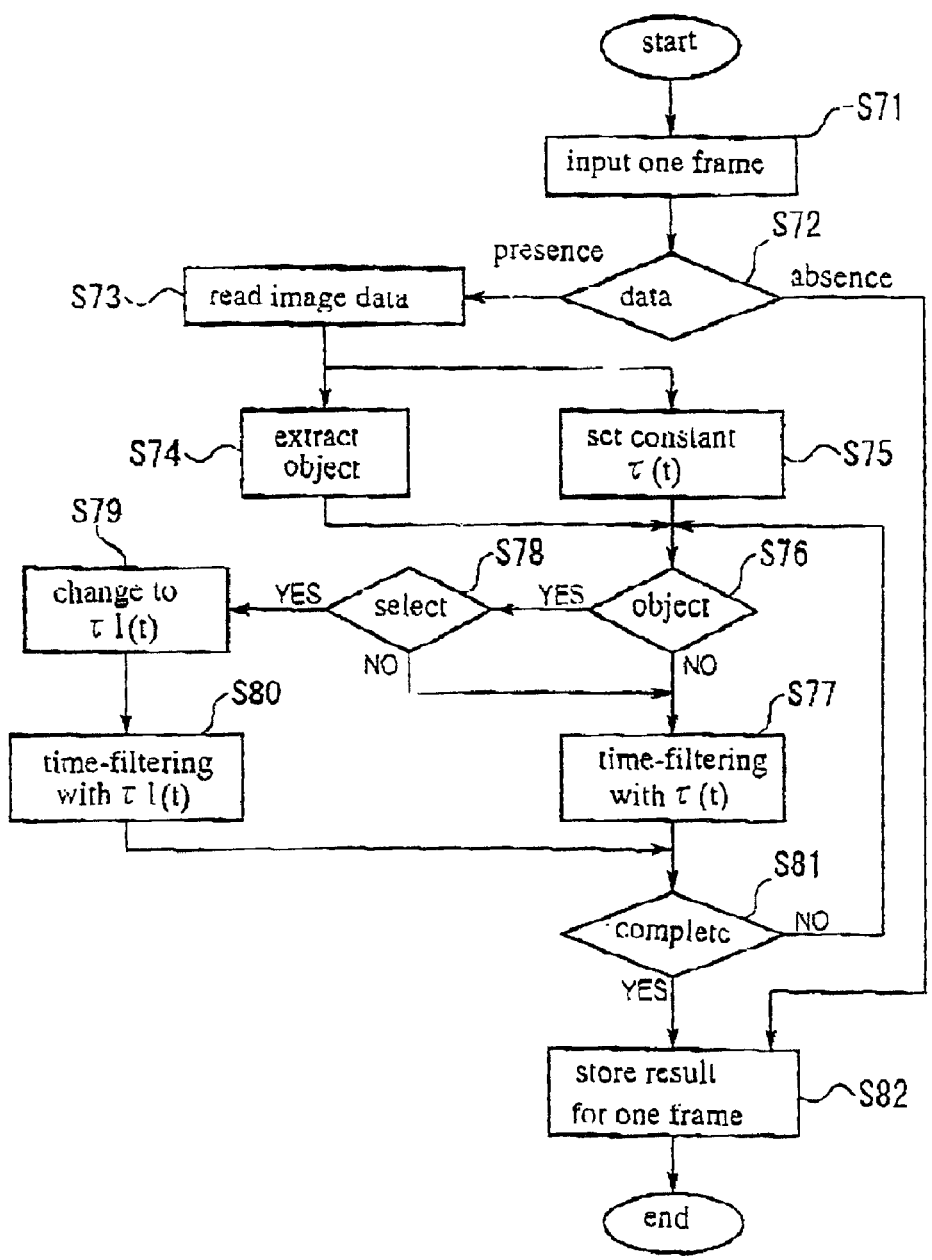
FIG. 7 is a flow chart of operations of the time-filtering processing unit included in the dynamic image processor in a third embodiment in accordance with the present invention.

FIG. 7 is a flow chart of operations of the time-filtering processing unit included in the dynamic image processor in a third embodiment in accordance with the present invention. In a step S71, the image data of a single frame are inputted by the input data converting unit 1 into the time-filtering processing unit 4. In a step S72, it is verified whether the past image data is stored.

If no past image data is stored, this means that the inputted data are the first data, then in a step S82, the control unit 7 stores the inputted image data into the image memory unit 2 and also renders the inputted image data output from the time-filtering processing unit 1. If the past image data is stored, then in a step S73, the motion detecting unit 3 reads the image data from the image memory unit 2. In a step S74, the motion detecting unit 3 extracts the moving object based on the image data as read out and the image data as extracted, whereby dynamic image mask data are created and stored into the image memory unit 2. The control unit 7 reads the dynamic image mask data in synchronizing with the timing of the time-filtering process to create the dynamic image mask signal. In a step S75, the time-filtering processing unit 4 sets the time constant $\tau(t)$ of the time-filter. In a step S76, the time-filtering processing unit 4 judges the masked region corresponding to the moving object based on the dynamic image mask signal.

If no masked region corresponding to the moving object is present, the time-filtering processing unit 4 performs the time-filtering process with the time constant $\tau(t)$ in a step S77. If the masked region corresponding to the moving object is present, the time-filtering processing unit 4 selects one of the time constant $\tau(t)$ and the time constant $\tau_1(t)$. If the time-filtering processing unit 4 selects the time constant $\tau(t)$, then the time-filtering processing unit 4 performs the time-filtering process with the time constant $\tau(t)$ in the step S77. If the time-filtering processing unit 4 selects the time constant $\tau_1(t)$, then the time-filtering processing unit 4 converts the time constant $\tau(t)$ into the time constant $\tau_1(t)$ in the step S79. In a step S80, the time-filtering processing unit 4 performs the time-filtering process with the time constant $\tau_1(t)$. In a step S81, the time-filtering process unit 4 judges whether the time-filtering process for the one frame has been completed. If the time-filtering process for the one frame has not yet been completed, then the operation will back to the step S76. If the time-filtering process for the one frame has been completed, then the time-filtering processing unit 4 outputs the image data for the one frame which are then stored into the image memory unit 2 in a step S82.

As described above, the selected moving object on the selected region is subjected to the modified time-filtering process at the time constant $\tau_1(t)$ with no attenuation or reduced attenuation, whilst the non-selected moving object on the other region than the selected region and the background image are subjected to the normal time-filtering process at the time constant $\tau(t)$, whereby the time-filtering processes may be made with the different time constants $\tau(t)$ and $\tau_1(t)$ for evaluation on the intention of the VDT-stress to the human by the moving object. The influence of the VDT-stress to the human may depend on the clinical data.

For example, if the moving object has an area which is not less than 1/100 of the area of the screen, then the VDT-stress is considered to be high and the time-filtering process with the time constant τ(t) is conducted.

Fourth Embodiment

Figure 8:
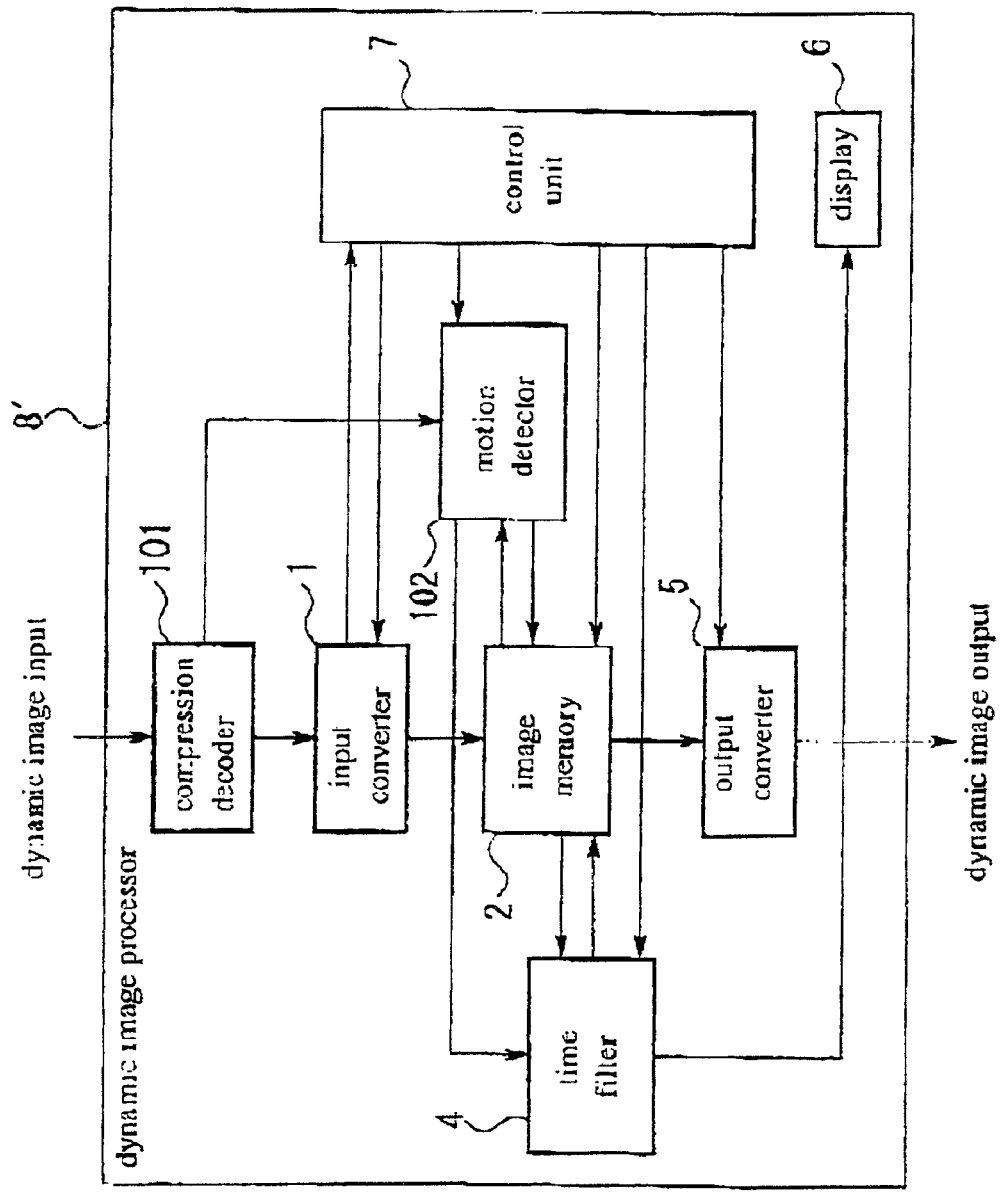
FIG. 8 is a block diagram illustrative of a dynamic image processor in a fourth embodiment in accordance with the present invention.

A fourth embodiment according to the present invention will be described in detail with reference to the drawings. FIG. 8 is a block diagram illustrative of a dynamic image processor in a fourth embodiment in accordance with the present invention. In the fourth embodiment, the dynamic image processor 8' further has a compressed-data decoding unit 101 in addition to the input data converting unit 1, the image memory unit 2, the motion detecting unit 3, the time-filtering processing unit 4, the output data converting unit 5, the display unit 6, and the control unit 7. The compressed-data decoding unit 101 decodes the compression if the compressed dynamic image data are inputted such as MPEG2. The compressed-data decoding unit 101 also recognizes the moving object and clips the moving object. The image memory unit 2 receives an information about the moving object from the compressed-data decoding unit 101 for extracting the moving object more easily and surely. The dynamic image processing 8 is responsible to the compressed data input.

Although the invention has been described above in connection with several preferred embodiments therefore it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A method of filtering for attenuation to a frequency component in a designated frequency band of a frequency of variation of a dynamic image, said method comprising:
   detecting said moving object; and
   subjecting at least a part of said moving object to a modified filtering process with at least a reduced attenuation and also a remaining part of said moving object to a normal filtering process with a non-reduced attenuation which is larger in magnitude than said reduced attenuation.

2. The method as claimed in claim 1, wherein an entirety of said moving object is uniformly subjected to said modified filtering process.

3. The method as claimed in claim 1, wherein said moving object is extracted depending on at least one factor of a size, a shape, a brightness, a color and a moving speed of the object.

4. The method as claimed in claim 1, wherein said reduced attenuation is fixed at a single magnitude to the attenuation.

5. The method as claimed in claim 1, wherein said reduced attenuation is selected from plural different magnitudes of the attenuation.

6. The method as claimed in claim 1, wherein said reduced attenuation is set at an optional value.

7. The method as claimed in claim 1, further comprising: decoding a compressed dynamic image data prior to detecting said moving object based on said decoded dynamic image data.

8. A method of filtering for attenuation to a frequency component in a designated frequency band of a frequency of variation of a dynamic image, said method comprising:
   detecting said moving object; and
   subjecting at least a part of said moving object to a modified filtering process with no attenuation and also a remaining part of said moving object to a normal filtering process with a predetermined attenuation.

9. The method as claimed in claim 8, wherein an entirety of said moving object is uniformly subjected to said modified filtering process.

10. The method as claimed in claim 8, wherein said moving object is extracted depending on at least one factor of a size, a shape, a brightness, a color and a moving speed of the object.

11. The method as claimed in claim 8, further comprising the step of de-coding a compressed dynamic image data prior to detecting said moving object based on said decoded dynamic image data.

12. A processor for processing a dynamic image including:
   a motion detector for detecting a moving object which moves over said dynamic image; and
   a time-filter processing unit for attenuation to a frequency component in a designated frequency band of a frequency of variation of a dynamic image,
   wherein said time-filter processing unit further includes a modified filtering process which at least a reduced attenuation and also subjects a remaining part of said moving object to a normal filtering process with at non reduced attenuation which is larger in magnitude than said reduced attenuation.

13. The processor as claimed in claim 12, wherein said filtering-process control unit uniformly subjects an entirety of said moving object to said modified filtering process.

14. The processor as claimed in claim 12, wherein said motion detector detects said moving object depending on at least one factor of a size, a shape, a brightness, a color and a moving speed of the object.

15. The processor as claimed in claim 12, wherein said filtering-process control unit sets said reduced attenuation at a single magnitude of the attenuation.

16. The processor as claimed in claim 12, wherein said filtering-process control unit selects said reduced attenuation from plural different magnitudes of the attenuation.

17. The processor as claimed in claim 12, wherein said filtering-process control unit sets said reduced attenuation at an optional value.

18. The processor as claimed in claim 12, further including a compression data decoder for decoding a compressed dynamic image data so that said motion detector detects said moving object based on said decoded dynamic image data.

19. A processor for processing a dynamic image including:
   a motion detector for detecting a moving object which moves over said dynamic image; and
   a time-filter processing unit for attenuation to a frequency component in a designated frequency band of a frequency of variation of a dynamic image,
   wherein said time-filter processing unit further includes a filtering-process control unit which subjects at least a part of said moving object to a modified filtering process without attenuation and also subjects a remaining part of said moving object to a normal filtering process with a predetermined attenuation.

20. The processor as claimed in claim 19, wherein said filtering process control unit uniformly subjects an entirety of said moving object to said modified filtering process.

21. The processor as claimed in claim 19, wherein said motion detector detects said moving object depending on at least one factor of a size, a shape, a brightness, a color and a moving speed of the object.

22. The processor as claimed in claim 19, further including a compression data decoder for decoding a compressed dynamic image data so that said motion detector detects said moving object based on said decoded dynamic image data.

23. A display device for processing a dynamic image including:
- a motion detector for detecting a moving object which moves over said dynamic image;
- a time-filter processing unit for attenuation to a frequent component in a designated frequency band of a frequency of variation of a dynamic image; and
- a display unit for displaying a dynamic image based on a dynamic image signal which has been processed by said time-filter processing unit,
- wherein said time-filter processing unit further includes filtering-process control unit which subjects at least a part of said moving object to a modified filtering process with at least a reduced attenuation and also subjects a remaining part of said moving object to a normal filtering process with a non-reduced attenuation which is larger in magnitude than said reduced attenuation.

24. The display device as claimed in claim 23, wherein said filtering-process control unit uniformly subjects an entirety of said moving object to said modified filtering process.

25. The display device as claimed in claim 23, wherein said motion detector detects said moving object depending on at least one factor of a size, a shape, a brightness, a color and a moving speed of the object.

26. The display device as claimed in claim 23, wherein said filtering-process control unit sets said reduced attenuation at a single magnitude of the attenuation.

27. The display device as claimed in claim 23, wherein said filtering-process control unit selects said reduced attenuation from plural different magnitudes of the attenuation.

28. The display device as claimed in claim 23, wherein said filtering-process control unit sets said reduced attenuation at an optional value.

29. The display device as claimed in claim 23, further including a compression data decoder for decoding a compressed dynamic image data so that said motion detector detects said moving object based on said decoded dynamic image data.

30. A display device for processing a dynamic image including:
- a motion detector for detecting a moving object which moves over said dynamic image;
- a time-filter processing unit for attenuation to a frequency component in a designated frequency band of a frequency of variation of a dynamic image; and
- a display unit for displaying a dynamic image based on a dynamic image signal which has been processed by said time-filter processing unit,
- wherein said time-filter processing unit further includes a filtering-process control unit which subjects at least a part of said moving object to a modified filtering process without attenuation and also subjects a remaining part of said moving object to a normal filtering process with a predetermined attenuation.

31. The display device as claimed in claim 30, wherein said filtering-process control unit uniformly subjects an entirety of said moving object to said modified filtering process.

32. The display device as claimed in claim 30, wherein said motion detector detects said moving object depending on at least one factor of a size, a shape, a brightness, a color and a moving speed of the object.

33. The display device as claimed in claim 30, further including a compression data decoder for decoding a compressed dynamic image data so that said motion detector detects said moving object based on said decoded dynamic image data.

* * * * *